United States Patent Office 3,514,502
Patented May 26, 1970

3,514,502
ORTHO-METHYL CYCLOPROPYL PHOSPHATES AND PHOSPHONATES
Gerald H. Peterson, 1326 S. Armacost Ave.,
West Los Angeles, Calif. 90025
No Drawing. Filed May 29, 1967, Ser. No. 642,209
Int. Cl. C07f 9/08, 9/38; C09k 3/00
U.S. Cl. 260—958          13 Claims

ABSTRACT OF THE DISCLOSURE

This invention relates to chemical compounds which are phosphate esters and phosphonate esters having three organic radicals at least one of which is the ortho-methyl cyclopropyl and the other organic radicals of which are the ortho-methyl cyclopropyl radical, the phenyl radical, or the tolyl radical.

These chemical compounds are useful for thermally stable fire resistant hydraulic fluids, especially for aircraft, either alone or admixed with other additives.

---

This invention relates to new chemical compounds which are phosphate esters and phosphonate esters having three organic radicals at least one of which is the ortho-methyl cyclopropyl and the other organic radicals of which are the ortho-methyl cyclopropyl radical, the phenyl radical, or the tolyl radical.

These new chemical compounds are useful for thermally stable fire resistant hydraulic fluids, especially for aircraft, either alone or admixed with other additives.

These compounds particularly include the following:

(1) Phosphate esters:
    Tri-ortho-methyl cyclopropyl phosphate
    Di-ortho-methyl cyclopropyl phenyl phosphate
    Mono-ortho-methyl cyclopropyl di-phenyl phosphate
    Di-ortho-methyl cyclopropyl tolyl phosphate
    Mono-ortho-methyl cyclopropyl di-tolyl phosphate
    Mono-ortho-methyl cyclopropyl tolyl phenyl phosphate (2) Phosphonate esters:
    Di-ortho-methyl cyclopropyl ortho-methyl cyclopropane phosphonate
    Di-ortho-methyl cyclopropyl benzene phosphonate
    Di-phenyl ortho-methyl cyclopropane phosphonate
    Di-ortho-methyl cyclopropyl toluene phosphonate
    Di-tolyl ortho-methyl cyclopropane phosphonate
    Mono-ortho-methyl cyclopropyl tolyl benzene phosphonate
    Mono-ortho-methyl cyclopropyl phenyl toluene phosphonate The phosphonate esters particularly include the following:

Di-ortho-methyl cyclopropyl ortho-methyl cyclopropane

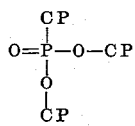

Herein CP stands for the ortho-methyl cyclopropyl radical.

Di-phenyl ortho-methyl cyclopropane

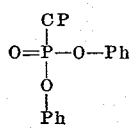

Herein Ph stands for the phenyl radical.

Di-meta-tolyl ortho-methyl cyclopropane

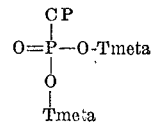

Herein T stands for the tolyl radical and generically designates ortho, meta, and para tolyl and mixtures thereof.

Ortho-methyl cyclopropyl meta-tolyl ortho-methyl cyclopropane

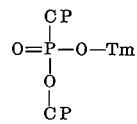

Herein Tm designates the meta-tolyl radical.

Ortho-methyl cyclopropyl phenyl ortho-methyl cyclopropane

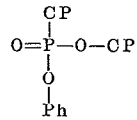

Di-ortho-methyl cyclopropyl benzene

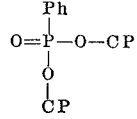

Di-ortho-methyl cyclopropyl toluene

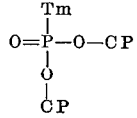

Ortho-methyl cyclopropyl phenyl benzene

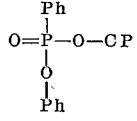

Ortho-methyl cyclopropyl meta-tolyl benzene

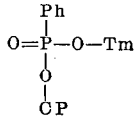

Ortho-methyl cyclopropyl tolyl toluene

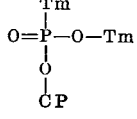

Ortho-methyl cyclopropyl phenyl toluene

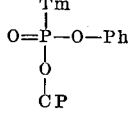

Tolyl phenyl ortho-methyl cyclopropane

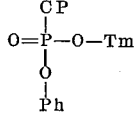

The ortho-methyl cyclopropyl radical is shown as follows:

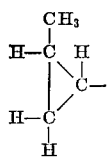

Each of these new foregoing chemical compounds can be made by the same methods used for making the corresponding phosphates and phosphonates where the propyl radical is used instead of the cyclopropyl radical. The methods of making the corresponding phosphates and phosphonates with propyl radical are known to those skilled in the art, and with the disclosure herein those skilled in the art to which my invention appertains will be able to make and use the new chemical compounds of my invention.

The preparation of the known phosphate esters and phosphonate esters having the propyl radical instead of the cyclopropyl radical of my invention is disclosed in the books entitled "Introduction to Hydraulic Fluids," by Roger E. Hatton, published by Reinhold Publishing Corporation, "Organo-Phosphorous Compounds," by G. M. Kosolopoff, published by John Wiley and Sons, "Synthetic Lubricants," edited by Reigh C. Gunderson and Andrew W. Hart, published by Reinhold Publishing Corporation, New York, and numerous other publications and issued patents. The particular relevant disclosure in the book entitled "Introduction to Hydraulic Fluids" appears on pages 190 through 195, and the particular relevant disclosure in the book entitled "Synthetic Lubricants" appears on pages 103 through 150.

Even though those skilled in the art will be able to prepare and use the new chemical compounds of my invention, there is given below examples of these compounds and their preparation.

EXAMPLE 1

Tri-ortho-methyl cyclopropyl phosphate 3.5 mols of ortho-methyl cyclopropyl alcohol are added dropwise with stirring to one mol of phosphorus oxychloride ($POCl_3$) at 25–35° C. The temperature is slowly brought up to about 65° C. and the pressure is slowly reduced to 50 mm./Hg with stirring to remove hydrogen chloride. The mixture is then distilled and tri-ortho-methyl cyclopropyl phosphate is collected.

EXAMPLE 2

Tri-ortho-methyl cyclopropyl phosphate

To 5 mols of ortho-methyl cyclopropanol, 3 mols of freshly cut metallic sodium are added in small cubes about ¼″ with stirring and maintaining the temperature between 25 and 40° C. When reaction is complete as evidenced by cessation of bubbling, one mol of phosphorus oxychloride ($POCl_3$) is added dropwise with stirring while maintaining the temperature at about 25–50° C. The reaction mixture is filtered to remove the precipitated sodium chloride and the filtrate is distilled and tri-ortho-methyl cyclopropyl phosphate is collected.

EXAMPLE 3

Di-ortho-methyl cyclopropyl phenyl phosphate 2 mols of ortho-methyl cyclopropanol are added dropwise with stirring to one mol of $POCl_3$ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of one mol of phenol in one mol of sodium hydroxide with good stirring. The mixture is allowed to rise in temperature to 25° C. with continued stirring. The resulting mixture is washed, dried and distilled to separate out the desired water insoluble di-ortho-methyl cyclopropyl phenyl phosphate.

EXAMPLE 4

Di-ortho-methyl cyclopropyl tolyl phosphate 2 mols of ortho-methyl cyclopropanol are added dropwise with stirring to one mol of $POCl_3$ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of one mol of meta-cresol in one mol of sodium hydroxide with good stirring. The mixture is allowed to rise in temperature to 25° C. with continued stirring. The resulting mixture is washed, dried and distilled to separate out the desired water insoluble di-ortho-methyl cyclopropyl meta-tolyl phosphate.

EXAMPLE 5

Mono-ortho-methyl cyclopropyl di-phenyl phosphate

One mol of ortho-methyl cyclopropanol is added dropwise with stirring to one mol of $POCl_3$ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 2 mols of phenol in 2 mols of NaOH with good stirring. The mixture is allowed to rise in temperature to 25° C. with continued stirring. The resulting mixture is washed, dried and distilled to separate out the desired water insoluble mono-ortho-methyl cyclopropyl di-phenyl phosphate.

EXAMPLE 6

Mono-ortho-methyl cyclopropyl para-tolyl phosphate

One mol of ortho-methyl cyclopropanol is added dropwise with stirring to one mol of $POCl_3$ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 2 mols of para-cresol in 2 mols of NaOH with good stirring. The mixture is allowed to rise in temperature to 25° C. with continued stirring. The resulting mixture is washed, dried and distilled to separate out the desired water insoluble mono-ortho-methyl cyclopropyl para-tolyl phosphate.

EXAMPLE 7

Mono-ortho-methyl cyclopropyl phenyl tolyl phosphate

One mol of ortho-methyl cyclopropanol is added dropwise with stirring to one mol of $POCl_3$ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of one mol of phenol in one mol of sodium hydroxide with good stirring. The mixture is allowed to rise in temperature to 25° C. with continued stirring. The mixture is filtered and the filtrate is added dropwise, without further purification, at 0–5° C. to a saturated solution of one mol of meta-cresol in one mol of NaOH with good stirring. The mixture is allowed to rise in temperature with continued stirring. The resulting mixture is washed, dried and distilled to separate out the desired water insoluble mono-ortho-methyl cyclopropyl phenyl meta-tolyl phosphate.

EXAMPLE 8

Di-ortho-methyl cyclopropyl ortho-methyl cyclopropane phosphate 3 mols of ortho-methyl cyclopropanol are added dropwise with stirring to one mol of ortho-methyl cyclopropane phosphorus oxydichloride at 25–35° C. The temperature is slowly brought up to about 65° C. and the pressure is slowly reduced to 50 mm./Hg with stirring to remove hydrogen chloride. The mixture is then distilled and di-ortho-methyl cyclopropyl ortho-methyl cyclopropane phosphate is collected.

EXAMPLE 9

Di-phenyl ortho-methyl cyclopropane phosphate 3 mols of phenol are added dropwise with stirring to one mol of ortho-methyl cyclopropane phosphorus oxydichloride at 25–35° C. The temperature is slowly brought up to about 65° C. and the pressure is slowly reduced to 50 mm./Hg with stirring to remove hydrogen chloride. The mixture is then distilled and di-phenyl ortho-methyl cyclopropane phosphonate is collected.

EXAMPLE 10

Di-meta-tolyl ortho-methyl cyclopropane phosphonate 3 mols of meta-cresol are added dropwise with stirring to one mol of ortho-methyl cyclopropane phosphorus oxydichloride at 25–35° C. The temperature is slowly brought up to about 65° C. and the pressure is slowly reduced to 50 mm./Hg with stirring to remove hydrogen chloride. The mixture is then distilled and di-meta-tolyl ortho-methyl cyclopropane phosphonate is collected.

EXAMPLE 11

Ortho-methyl cyclopropyl meta-tolyl ortho-methyl cyclopropane phosphonate

One mol of ortho-methyl cyclopropanol is added dropwise with stirring to one mol of ortho-methyl cyclopropane phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of one mol of meta-cresol in one mol of sodium hydroxide with good stirring. The mixture is allowed to rise in temperature to 25° C. with continued stirring. The resulting mixture is washed, dried and distilled to separate out the desired water insoluble ortho-methyl cyclopropyl meta-tolyl ortho-methyl cyclopropane phosphonate.

EXAMPLE 12

Ortho-methyl cyclopropyl phenyl ortho-methyl cyclopropane phosphonate

One mol of ortho-methyl cyclopropanol is added dropwise with stirring to one mol of ortho-methyl cyclopropane phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of one mol of phenol in one mol of sodium hydroxide with good stirring. The mixture is allowed to rise in temperature to 25° C. with continued stirring. The resulting mixture is washed, dried and distilled to separate out the desired water insoluble ortho-methyl cyclopropyl phenyl ortho-methyl cyclopropane phosphonate.

EXAMPLE 13

Di-ortho-methyl cyclopropyl benzene phosphonate 3 mols of ortho-methyl cyclopropanol are added dropwise with stirring to one mol of benzene phenyl phosphorus oxydichloride at 25–35° C. The temperature is slowly brought up to about 65° C. and the pressure is slowly reduced to 50 mm./Hg with stirring to remove hydrogen chloride. The mixture is then distilled and di-ortho-methyl cyclopropyl benzene phosphonate is collected.

EXAMPLE 14

Di-ortho-methyl cyclopropyl toluene phosphonate 3 mols of ortho-methyl cyclopropanol are added dropwise with stirring to one mol of meta-toluene phosphorus oxydichloride at 25–35° C. The temperature is slowly brought up to about 65° C. and the pressure is slowly reduced to 50 mm./Hg with stirring to remove hydrogen chloride. The mixture is then distilled and di-ortho-methyl cyclopropyl toluene phosphonate is collected.

EXAMPLE 15

Ortho-methyl cyclopropyl phenyl benzene phosphonate

One mol of ortho-methyl cyclopropanol is added dropwise with stirring to one mol of benzene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of one mol of phenol in one mol of sodium hydroxide with good stirring. The mixture is allowed to rise in temperature to 25° C. with continued stirring. The mixture is washed, dried and distilled and ortho-methyl cyclopropyl phenyl benzene phosphonate is collected.

EXAMPLE 16

Ortho-methyl cyclopropyl meta-tolyl benzene phosphonate

One mol of ortho-methyl cyclopropanol is added dropwise with stirring to one mol of benzene phopshorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of one mol of meta-cresol in one mol of sodium hydroxide with good stirring. The mixture is allowed to rise in temperature to 25° C. with continued stirring. The mixture is washed, dried and distilled and ortho-methyl cyclopropyl meta-tolyl benzene phosphonate is collected.

EXAMPLE 17

Ortho-methyl cyclopropyl tolyl toluene phosphonate

One mol of ortho-methyl cyclopropanol is added dropwise with stirring to one mol of meta-toluene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of one mol of meta-cresol in one mol of sodium hydroxide with good stirring. This mixture is allowed to rise in temperature to 25° C. with continued stirring. The mixture is washed, dried and distilled and ortho-methyl cyclopropyl tolyl toluene phosphonate is collected.

EXAMPLE 18

Ortho-methyl cyclopropyl phenyl toluene phosphonate

One mol of ortho-methyl cyclopropanol is added dropwise with stirring to one mol of meta-toluene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of one mol of phenol in one mol of sodium hydroxide with good stirring. This mixture is allowed to rise in temperature to 25° C. with continued stirring. The mixture is washed, dried and distilled and ortho-methyl cyclopropyl phenyl toluene phosphonate is collected.

EXAMPLE 19

Tolyl phenyl ortho-methyl cyclopropane phosphonate

One mol of meta-cresol is added dropwise with stirring to one mol of ortho-methyl cyclopropane phosphorous oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of one mol of phenol in one mol of sodium hydroxide with good stirring. This mixture is allowed to rise in temperature to 25° C. with continued stirring. The mixture is washed, dried and distilled and tolyl phenyl ortho-methyl cyclopropane phosphonate is collected.

The composition of my invention have high thermal stability apparently due to the presence of the ortho-methyl cyclopropyl radical, high fire resistance, good lubricity, especially hydrodynamic lubricity, good boundary lubrication and good anti-wear, have ability to lubricate moving parts, particularly steel on steel, good viscosity and viscosity-temperature properties, and are readily admixed with many additives.

I claim:

1. The phosphate and phosphonate esters represented by the formula $(R_1R_2R_3)O_2O_xPO$ in which $x$ may be one or zero, $R_1$ is ortho-methyl cyclopropyl, and $R_2$ and $R_3$ are ortho-methyl cyclopropyl, phenyl or tolyl.
2. The chemical compound as defined in claim 1 which is tri-ortho-methyl cyclopropyl phosphate.
3. The chemical compound as defined in claim 1 which is di-ortho-methyl cyclopropyl ortho-methyl cyclopropane phosphonate.
4. The chemical compound as defined in claim 1 which is di-ortho-methyl cyclopropyl phenyl phosphate.
5. The chemical compound as defined in claim 1 which is di-ortho-methyl cyclopropyl benzene phosphonate.
6. The chemical compound as defined in claim 1 which is di-ortho-methyl cyclopropyl tolyl phosphonate.
7. The chemical compound as defined in claim 1 which is mono-ortho-methyl cyclopropyl di-phenyl phosphate.
8. The chemical compound as defined in claim 1 which is mono-ortho-methyl cyclopropyl phenyl benzene phosphonate.
9. The chemical compound as defined in claim 1 which is mono-otho-methyl cyclopropyl di-tolyl phosphate.
10. The chemical compound as defined in claim 1 which is mono-ortho-methyl cyclopropyl tolyl toluene phosphonate.
11. The chemical compound as defined in claim 1 which is mono-ortho-methyl cyclopropyl tolyl benzene phosphonate.
12. The chemical compound as defined in claim 1 which is mono-ortho-methyl cyclopropyl tolyl benzene phosphonate.
13. The chemical compound as defined in claim 1 which is mono-ortho-methyl cyclopropyl phenyl toluene phosphonate.

References Cited

UNITED STATES PATENTS

| | | | |
|---|---|---|---|
| 1,959,228 | 5/1934 | Blagden et al. | 260—958 XR |
| 2,682,522 | 6/1954 | Coover et al. | 260—958 XR |

CHARLES B. PARKER, Primary Examiner

A. H. SUTTO, Assistant Examiner

U.S. Cl. X.R.

252—78; 260—973, 974